United States Patent Office 3,303,172
Patented Feb. 7, 1967

3,303,172
CURE SYSTEM FOR ETHYLENE-VINYL CHLORIDE POLYMERS
Ann M. Schreiber, Parma Heights, Ohio, assignor to The B. F. Goodrich Company, New York, N.Y., a corporation of New York
No Drawing. Filed June 1, 1965, Ser. No. 460,555
6 Claims. (Cl. 260—79.5)

This invention relates to a process for the cure of rubbery ethylene-vinyl chloride copolymers.

Copolymers of ethylene and vinyl chloride are old in the art, being disclosed in United States Patent 2,200,429. Processes for preparation of ethylene-vinyl chloride polymers are disclosed in United States Patents 2,342,400, 2,388,178, 2,396,677, and 2,422,392.

Ethylene-vinyl chloride copolymers containing from 10% to 99% by weight ethylene are flexible plastic or rubbery elastomeric materials. These copolymers are prepared from inexpensive monomers, ethylene and vinyl chloride, and are of great interest to users of chlorinated elastomeric materials in the fabrication of hose and tubing, belting, films, and the like. Ethylene-vinyl chloride rubbers are saturated copolymers containing substantial amounts of chlorine. They are similar in structure to chlorinated polyethylene of similar chlorine content. Chlorobutyl rubber and chlorosulfonated polyethylene are other saturated, specialty rubber systems presently known and used. As with chlorobutyl rubber and chlorosulfonated polyethylene, the uses to which ethylene-vinyl chloride rubbers can be put will be greatly increased if a means can be found to cure or crosslink the polymers to give them increased strength, improved wear properties, and resistance to aging and weathering. When sulfur alone is used as the vulcanizing agent with rubbery ethylene-vinyl chloride polymer, the polymer is degraded in the vulcanization to a useless material, crumbly and brittle.

It has now been discovered that rubbery, saturated ethylene-vinyl chloride copolymers may be cured by the addition of combined sulfur and dialkyl and trialkylthioureas of the structure

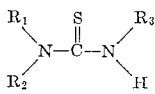

wherein $R_1$ is hydrogen or an alkyl radical containing 1 to 6 carbon atoms and $R_2$, and $R_3$ are members of the class consisting of alkyl groups containing from 1 to 6 carbon atoms. The groups $R_1$, $R_2$ and $R_3$ may be the same or different radicals and the alkyl radicals may be straight or branched chain. When $R_1$ is hydrogen, the compound is a dialkylthiourea; when $R_1$ is alkyl, the compound is a trialkylthiourea. Vulcanizing agents of the invention include, for example, N-ethyl-N',N'-dimethylthiourea, N-isopropyl-N',N'-dimethylthiourea, N-butyl-N',N'-diethylthiourea, N',N' - diethyl-N'-butylthiourea, N-propyl-N'-butyl-N'-pentylthiourea, N,N',N'-tripentylthiourea, N,N'-diethylthiourea, N,N'-dibutylthiourea and the like.

The thiourea vulcanizing agents may be prepared by reacting a secondary amine and an isothiocyanate as shown by:

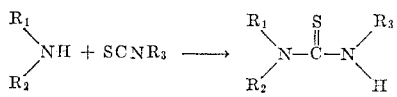

where $R_1$, $R_2$ and $R_3$ are defined as above. A description of this and other methods of preparation is found in Chemical Reviews, volume 55, pages 181–228 (1955).

The amount of these alkylthioureas which may be employed in the vulcanization of 100 parts ethylene-vinyl chloride polymers combined with from 1 to 3 parts of sulfur may vary from 1 part to 10 parts. A preferred range has been found to be 4 parts to 6 parts per 100 parts of polymer.

Antioxidants, fillers, colors, softeners and other known compounding ingredients may also be added to combinations of ethylene-vinyl chloride polymers with the favored polyalkylthiourea vulcanizing agents.

Ethylene-vinyl chloride copolymers are readily prepared by known bulk and emulsion polymerization systems. Bulk polymerizations are performed in high pressure reactors at 1000 to 2000 atmospheres. Emulsion polymerizations are run at 100 to 300 atmospheres. Polymers are purified by dissolving in solvent, clarifying, and reprecipitating. Compounding and mixing of the polymers are performed on standard rubber mixing equipment, mills and the like.

Stocks are preferably press cured, but hot oven or autoclave curing is also feasible.

The following examples are set forth as illustrative of this invention. Parts are in parts by weight.

EXAMPLE I

The following recipe is charged to a high pressure polymerizer equipped for agitation and temperature control.

| Material: | Parts by weight |
|---|---|
| Vinyl chloride | 288 |
| Ethylene | 474 |
| Diisopropylperoxydicarbonate | 0.5 |

The polymerization is run for 66 minutes at 50° C. and 27,000 p.s.i. with a pressure drop of 6,000 p.s.i. over the period. A white, elastomeric ethylene-vinyl chloride copolymer is purified by dissolving in chloroform and reprecipitating in methanol. The copolymer analyzes 68.7 vinyl chloride and 31.3% ethylene by weight. Dilute solution viscosity (DSV) in cyclohexanone at 25° C. (0.4 g./100 ml.) is 0.890.

The copolymer is compounded on a laboratory mill by milling approximately 15 minutes, in the following recipe:

| Copolymer | 100 |
|---|---|
| Carbon black | 30 |
| Stearic acid | 1 |
| Sulfur | 2 |
| N-ethyl-N,N'-dimethylthiourea | 5 |

After 65 minutes cure at 310° F., the vulcanizate has a tensile strength of 5150 p.s.i., elongation 525% and 300% modulus of 2330 p.s.i. After 8 days aging at 100° C., this vulcanizate has a tensile strength of 2850 p.s.i. and elongation of 425%.

When the recipe given above is employed, except that sulfur is omitted, a vulcanization cycle of 65' at 310° F. produces no cure as evidenced by the fact that the compounded copolymer is soluble in toluene, indicating that sulfur is essential to the cure.

When 5 parts N,N'-dibutylthiourea are employed in the above recipe in place of the N-ethyl-N,N'-dimethylthiourea, a cure cycle of 65' at 310° F. yields a stock with tensile strength of 3400 p.s.i., elongation 560%, and 300% modulus of 1170 p.s.i.

EXAMPLE II

An ethylene-vinyl chloride copolymer analyzing 30% ethylene, 70% vinyl chloride by weight, with DSV in cyclohexanone at 25° C.=0.88 is compounded in the following recipes:

| Run | A | B | C | D | E |
|---|---|---|---|---|---|
| Material, Parts: | | | | | |
| Ethylene-vinyl Chloride copolymer | 100 | 100 | 100 | 100 | 100 |
| Carbon Black | 30 | 30 | 30 | 30 | 30 |
| Sulfur | 2 | 2 | 2 | 2 | 2 |
| Thiourea | 5 | | | | |
| N-butylthiourea | | 5 | | | |
| 1,3-dibutylthiourea | | | 5 | | |
| N-ethyl-N'-N'-dimethylthiourea | | | | 5 | |
| N,N,N',N'-tetramethylthiourea | | | | | 5 |

Samples are mold cured 35 minutes at 310° F. One gram samples of the cured stocks are exposed for 78 hours in (1) tetrahydrofuran and (2) toluene. The only stocks remaining completely insoluble in the two solvents, hence showing the most complete state of cure, are C and D, the stocks cured with N-ethyl-N'-N'-dimethylthiourea, and N,N'-dibutylthiourea. It is unexpected that the dialkylthiourea and trialkylthiourea induce a cure in combination with sulfur, while thiourea, monoalkylthiourea and tetraalkylthiourea do not induce a cure when employed under the same conditions.

I claim:

1. A vulcanizable ethylene-vinyl chloride copolymer composition comprising 100 parts of an unvulcanized ethylene-vinyl chloride copolymer, from 1 to 3 parts of sulfur, and from about 1 part to 10 parts of an alkylthiourea selected from the group having the general formula

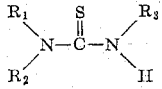

where $R_1$ is selected from the class consisting of hydrogen and alkyl radicals having from 1 to 6 carbon atoms and $R_2$ and $R_3$ are alkyl radicals having from 1 to 6 carbon atoms.

2. The composition of claim 1 wherein the alkylthiourea is N-ethyl-N',N'-dimethylthiourea.

3. The composition of claim 1 wherein the alkylthiourea is N,N'-dibutylthiourea.

4. The process of vulcanizing ethylene-vinyl chloride copolymers comprising incorporating in 100 parts of an ethylene-vinyl chloride polymer stock from 1 to 3 parts of sulfur and from about 4 parts to about 6 parts of an alkylthiourea compound of the formula

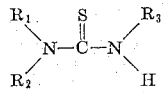

where $R_1$ is selected from the class consisting of hydrogen and alkyl radicals having from 1 to 6 carbon atoms and $R_2$ and $R_3$ are alkyl radicals having from 1 to 6 carbon atoms.

5. The process of claim 4 wherein the alkylthiourea is N-ethyl-N',N'-dimethylthiourea.

6. The process of claim 4 wherein the alkylthiourea is N,N'-dibutylthiourea.

References Cited by the Examiner

UNITED STATES PATENTS

| 2,405,008 | 7/1946 | Berry et al. | 260—79.5 |
| 2,416,878 | 3/1947 | Lindsey et al. | 260—79.5 |
| 2,804,447 | 8/1957 | Naylor | 260—79.5 |

JOSEPH L. SCHOFER, *Primary Examiner.*

D. K. DENENBERG, *Assistant Examiner.*